G. MEURER.
BEER-VATS.

No. 181,962. Patented Sept. 5, 1876.

Witnesses.
Otto Anfeland
Chas. Wahlers.

Inventor.
Geo. Meurer
by
Van Santvoord & Hauff
his attorneys

UNITED STATES PATENT OFFICE.

GEORGE MEURER, OF STAPLETON, NEW YORK.

IMPROVEMENT IN BEER-VATS.

Specification forming part of Letters Patent No. 181,962, dated September 5, 1876; application filed August 18, 1876.

*To all whom it may concern:*

Be it known that I, GEORGE MEURER, of Stapleton, county of Richmond and State of New York, have invented a new and useful Improvement in Vats for Cooling Beer and other Liquids, which improvement is fully set forth in the following specification, reference being had to the accompanying drawing, in which—

Figure 1:
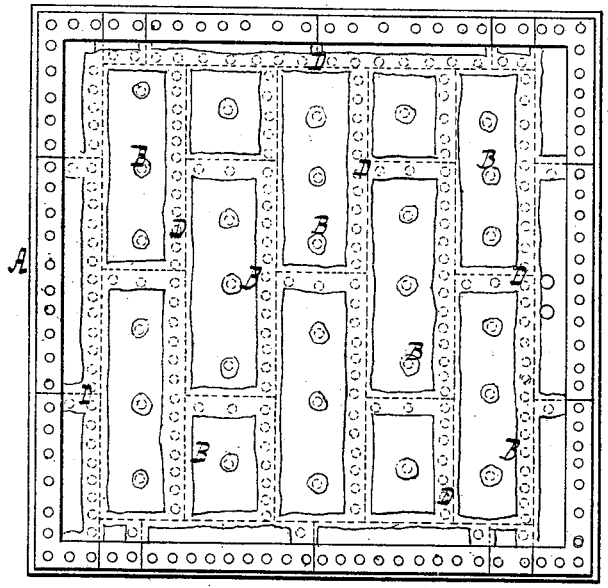
Figure 2:
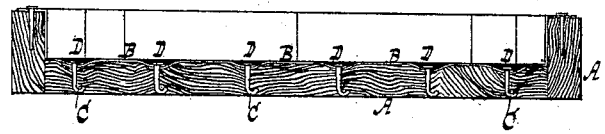
Figure 3:
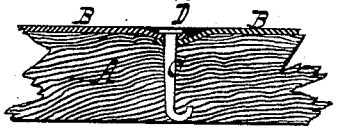

Figure 1 represents a plan view of a vat containing my improvement. Fig. 2 is a cross-section thereof. Fig. 3 shows portion of the vat-lining on a larger scale than in the previous figures.

Similar letters indicate corresponding parts.

My improvement relates especially to that class of vats which are constructed of wood, and provided with a lining of sheet metal made in sections; and it consists in a peculiar method of connecting the said sections of the lining, so as to produce a more tight and durable joint than has heretofore been made.

To this end the said sections of sheet metal composing the lining are made to overlap each other at their edges, and nails or rivets are driven through the same, and secured in the bottom of the vat, while solder is run between and over the overlapping edges and over the heads of the rivets, by which means the said sections are firmly cemented or connected together, and fastened to the bottom of the vat, while a close joint is produced also between the nails or rivets and the said sections.

In the drawing, the letter A designates the body of my vat, which is preferably made of wood, and B are the sections of its sheet-metal lining. Each of these sheet-metal sections B is made to overlap the one adjacent to it, as shown in Figs. 2 and 3, and nails or rivets C are driven through such overlapping portions of the sections and through the bottom of the vat, nails being preferably used which can be clinched beneath the said bottom. When the nails or rivets C have been properly secured, solder is run between and over the overlapping edges of the sections B, as shown at D, such solder being at the same time made to cover the heads of the nails or rivets C. The solder readily fills up all interstices or crevices between the overlapping edges of the sheet-metal sections B, and closes up also the holes formed by the nails or rivets C in driving the latter into or through the same. By the said nails or rivets C the sections B are securely fastened to the bottom of the vat A, and through the solder D they are firmly connected or cemented together. In some cases nails or rivets are driven through the sheet-metal sections B, at divers points between their edges, so as to prevent bulging thereof, as in the example shown.

In sectional linings of sheet metal as now commonly made, the sections are united by folding the edges thereof on themselves, and interlocking such edges with each other, solder being applied to the outer portion of the joint. The edges of the sections are also made to simply overlap each other, and nails driven into that edge which is lowermost, while the uppermost edge is soldered. In either of these cases moisture is allowed to creep up from the body of the vat between the edges of the sections, and thus the joint is liable to corrode, and become destroyed in a short time. By running the solder between the overlapping edges of the sheet-metal sections, as I have described, the several sections become as one sheet, and the disadvantages just mentioned are obviated.

I am aware that sheets of metal composing metal roofing have had their edges overlap, and the same secured together and to the roof-boards by screws, melted solder being applied into counter-sinks around the screw-heads and between the overlapping edges, so as to cover the screw-heads and the joint between the metal sheets; therefore, I do not claim such.

What I claim as new, and desire to secure by Letters Patent, is—

A vat for cooling beer or other liquids, constructed with a sheet-metal lining, which is made in sections overlapping each other at their edges, and fastened together and to the bottom of the vat by means of nails or rivets driven through the metal and clinched in position, and having solder run between and over the overlapping edges of the said sections, and over the heads of the nails or rivets, substantially as and for the purpose described.

In testimony that I claim the foregoing I have hereunto set my hand and seal this 9th day of August, A. D. 1876.

GEO. MEURER. [L. S.]

Witnesses:
 J. VAN SANTVOORD,
 CHAS. WAHLERS.